June 11, 1940.  W. J. CLEMENTS  2,203,814
AIR CONTROL SYSTEM FOR VEHICLES
Filed Oct. 14, 1938  2 Sheets-Sheet 1
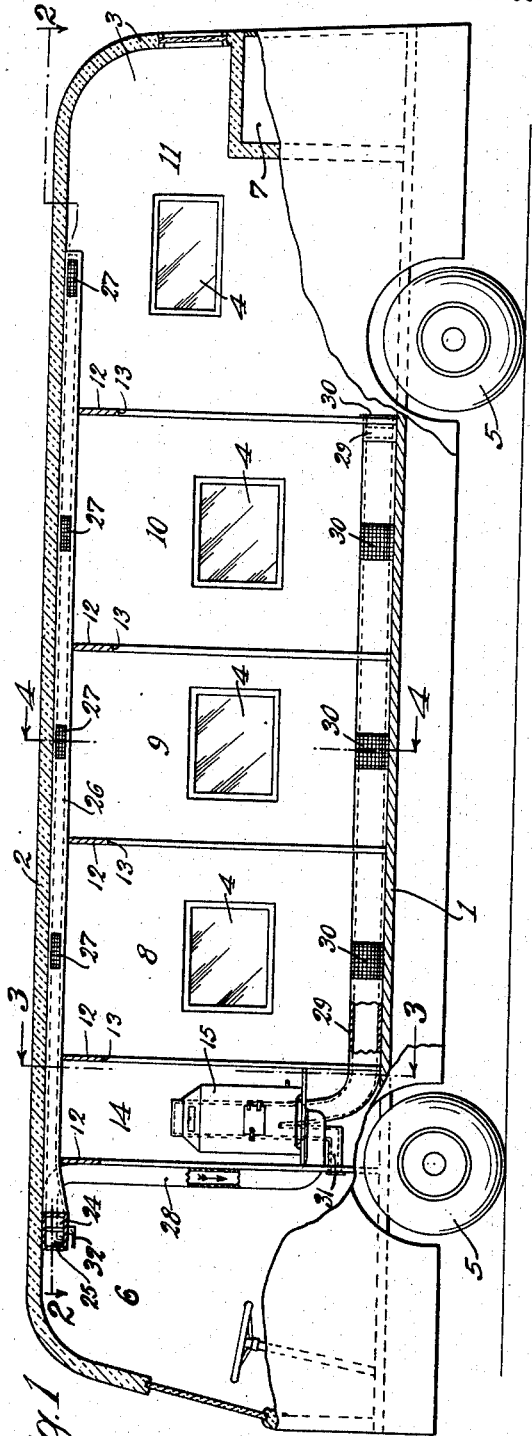
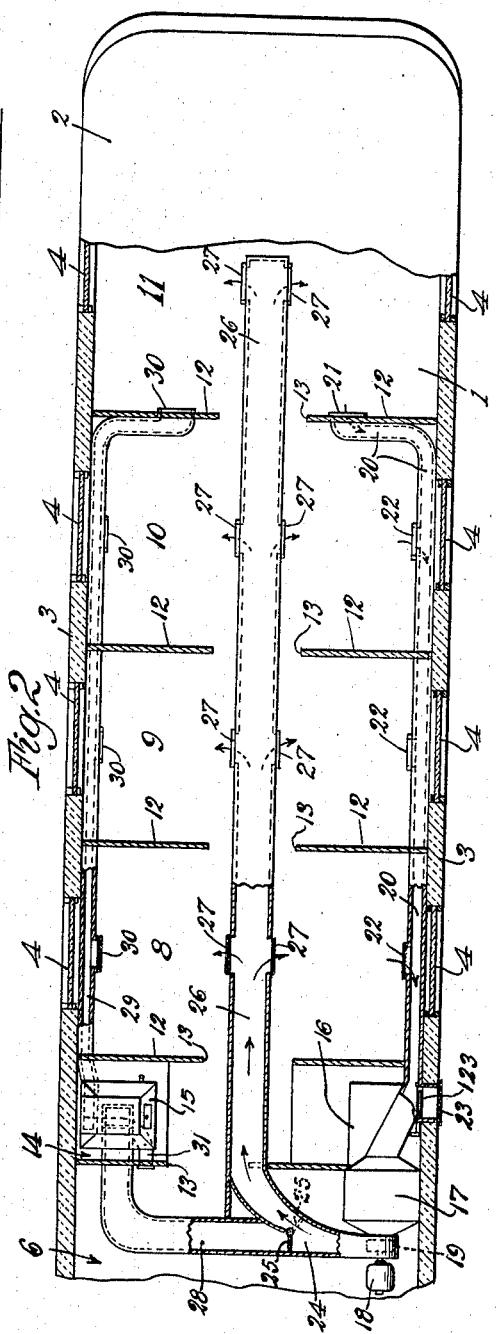
Inventor
William J. Clements

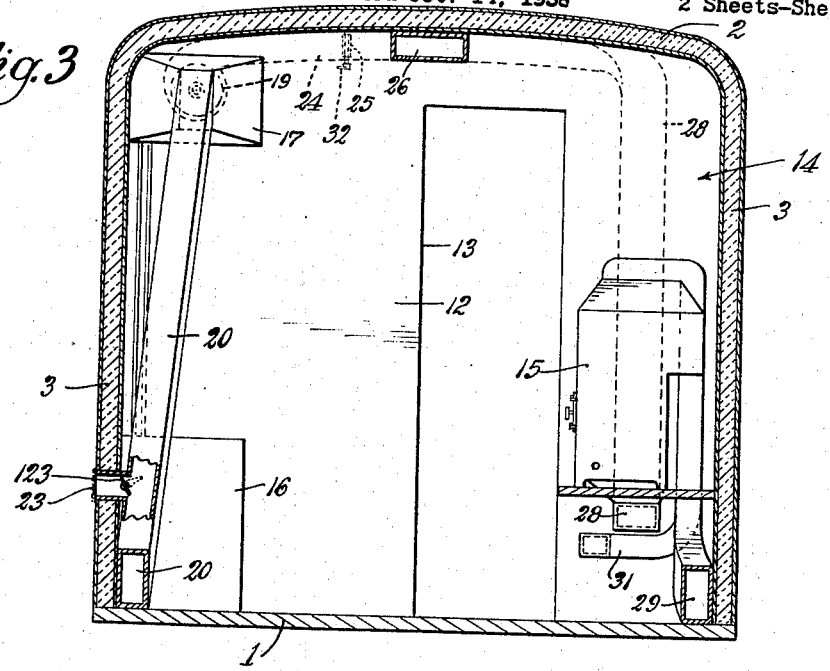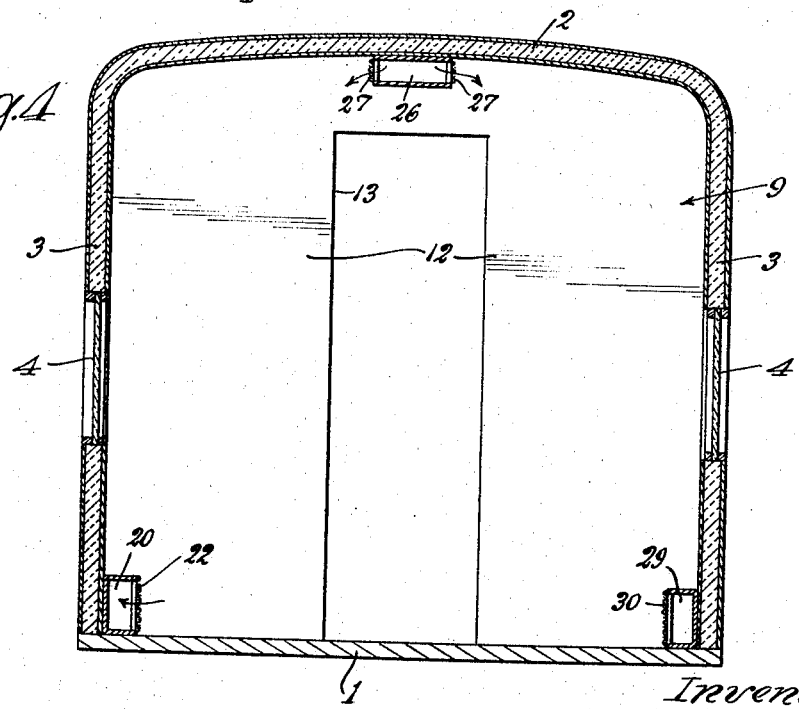

Patented June 11, 1940

2,203,814

UNITED STATES PATENT OFFICE 2,203,814

AIR CONTROL SYSTEM FOR VEHICLES

William J. Clements, Chicago, Ill., assignor to Clements Mfg. Co., Chicago, Ill., a corporation of Illinois Application October 14, 1938, Serial No. 234,976

2 Claims. (Cl. 98—4)

My invention relates to improvements in air control systems for vehicles and the like, and has for one object to provide a new and improved system which will enable a motor vehicle or the like to be heated or cooled or to be ventilated or both, with a minimum of expense and complication and a maximum of comfort to the passengers.

Other objects will appear from time to time in the course of the specification and claims.

My invention is illustrated more or less diagrammatically in the accompanying drawings, wherein:

Figure 1 is a longitudinal elevation in part section of the vehicle showing my apparatus and system in place;

Figure 2 is a diagrammatic part section along the line 2—2 of Figure 1;

Figure 3 is a section along the line 3—3 of Figure 1; and

Figure 4 is a section on the line 4—4 of Figure 1.

Like parts are indicated by like characters throughout the specification and drawings.

Referring to the drawings, the automotive vehicle to which my invention is applied is illustrated diagrammatically. In general, it has a floor 1, a roof 2, side walls 3, and windows 4. It is supported on wheels 5, has a driver's compartment 6, and an engine compartment 7. It is divided up into a plurality of passenger compartments 8, 9, 10 and 11, separated by partitions 12 with doorways 13 therethrough. At the front of the vehicle immediately behind the driver's compartment 6 is an air control compartment 14.

15 is a heater, 16 an air compressor, and 17 is an evaporator compartment, all of which may be located in or adjacent to the driver's compartment 6 and the air control compartment 14, or on the floor, or at any other convenient location. 18 is a motor and 19 an air circulating fan associated with the evaporator.

20 is a return duct which may be located adjacent the floor of the vehicle adjacent one wall. It has air intake ports 21, 22 communicating with the various compartments in the vehicle, and an air intake port 23 adapted to receive air from the outside. A valve 123 is provided to control this outside air intake port. The duct 120 discharges into the evaporator compartment 17. Leading from the evaporator compartment 17 and associated with the fan 19 is a discharge manifold 24. A valve 25 associated with the discharge manifold may selectively direct the air propelled by the fan 19 through a cold air duct 26 which may be located at or near the top of the vehicle, and is shown immediately below the roof and along the center line. This cold air duct has a plurality of discharge apertures 27 communicating with the various compartments.

The valve 25 may, however, direct the air into the hot air system through the duct 28, which extends downwardly from the roof and communicates at its lower end with the air jacket encircling the furnace 15 at the bottom thereof. Air under pressure is forced through the jacket, discharged through the hot air duct 29, and the hot air ports 30 communicating with the various compartments of the vehicle adjacent the floor on the side opposed to the return duct 20. 31 is an auxiliary branch discharging hot air into the driver's compartment. 32 is a hand lever whereby the operator may control the position of the valve 25.

With the arrangement shown, when it is desired to heat the vehicle the fan is started, air is circulated, with the valve 25 in its dotted line position. Spent air is withdrawn from the floor of the vehicle, passed through the evaporator compartment and any suitable strainer and air cleaner not shown in detail, forced through the jacket surrounding the furnace, where it is heated, and is then discharged into the vehicle along the side opposite to the side from which it was withdrawn. This air will circulate throughout the compartment, the hot air tending to rise to the top, the cool air being drawn from the bottom on the opposite side of the vehicle, so that an even and satisfactory heating effect will be obtained, without eddy currents, drafts or the like.

If it is desired to bring in outside air for makeup, the valve 123 will be manipulated to open the auxiliary air intake port and any make-up air may be passed through the strainer and air cleaner and properly cleaned.

If on the other hand it is desired to circulate cool air through the vehicle, the valve 25 may be placed in the full line position. Then the motor will circulate air not through the heater system but through the duct in the center top of the vehicle. The air currents will pass out of the various discharge ports to replace the air which has been drawn from each compartment through the cold air return duct. Under these circumstances, the heater will normally be out of operation, although if for any reason the heater should remain in operation its effect on the whole system will be reduced to a minimum because, since there will be no circulation of air through the jacket surrounding the heater, the heater will be effectively insulated from the body of the vehicle.

Suitable means, such as any suitable outlet aperture, may be provided for permitting the escape of used air from the vehicle.

It will be realized that whereas I have described and illustrated a practical and operative device, nevertheless many changes may be made in the size, shape, number and disposition of parts without departing from the spirit of my invention. I therefore wish my description and drawings to be taken as in a broad sense illustrative and diagrammatic, rather than as limiting me to my precise showing.

It will be understood also that whereas I have shown my invention as applied to a vehicle, it is susceptible of a number of uses or applications. It may be employed in buses, trailers, trucks, speed boats and other boats, and railroad cars, or even small fixed dwellings.

I claim:

1. Air control systems for vehicles and the like including an air heating element, an air cooling element, an air circulating fan, a conduit system joining them, a cold air duct adjacent the top of the vehicle in communication with the discharge side of the fan, a hot air duct adjacent one side of the floor of the vehicle in communication with the discharge side of the fan and a return air duct adjacent the floor of the vehicle on the other side thereof in communication with the intake side of the fan, a single manually adjustable valve adapted to control the flow of air from the discharge side of the fan selectively through one or other of the ducts associated therewith, all three of the ducts being apertured at a plurality of points throughout the vehicle.

2. Air control systems for vehicles and the like including an air heating element, an air cooling element, an air circulating fan, a conduit system joining them, a cold air duct adjacent the top of the vehicle in communication with the discharge side of the fan, a hot air duct adjacent one side of the floor of the vehicle in communication with the discharge side of the fan and a return air duct adjacent the floor of the vehicle on the other side thereof in communication with the intake side of the fan, a single manually adjustable valve adapted to control the flow of air from the discharge side of the fan selectively through one or other of the ducts, all three of said ducts being apertured at a plurality of points throughout the vehicle, the cooling element being interposed between the return air duct and the fan.

WILLIAM J. CLEMENTS.